(12) United States Patent
Stanevich et al.

(10) Patent No.: US 12,229,690 B2
(45) Date of Patent: Feb. 18, 2025

(54) SYSTEM AND METHOD FOR DETERMINING EXPECTED LOSS USING A MACHINE LEARNING FRAMEWORK

(71) Applicant: THE TORONTO-DOMINION BANK, Toronto (CA)

(72) Inventors: Ilya Stanevich, Toronto (CA); Maxime Lafleur-Forcier, Boucherville (CA); Xuling Wang, Toronto (CA); Philippe Meunier, Montreal (CA); Mathieu Jacob, Montreal (CA); Robert Chamoun, Montreal (CA); Bruno Veillete-Cossette, Montreal (CA)

(73) Assignee: THE TORONTO-DOMINION BANK, Toronto (CA)

( * ) Notice: Subject to any disclaimer, the term of this patent is extended or adjusted under 35 U.S.C. 154(b) by 808 days.

(21) Appl. No.: 17/357,760

(22) Filed: Jun. 24, 2021

(65) Prior Publication Data
US 2022/0414495 A1    Dec. 29, 2022

(51) Int. Cl.
*G06N 5/04*    (2023.01)
*G06N 20/00*   (2019.01)
(Continued)

(52) U.S. Cl.
CPC .............. *G06N 5/04* (2013.01); *G06N 20/00* (2019.01); *G06Q 30/0205* (2013.01); *G06Q 40/08* (2013.01)

(58) Field of Classification Search
CPC ..... G06N 20/00; G06Q 30/0205; G06Q 40/08
See application file for complete search history.

(56) References Cited

U.S. PATENT DOCUMENTS

| | | | |
|---|---|---|---|
| 7,072,841 B1* | 7/2006 | Pednault | G06Q 40/08 705/3 |
| 7,392,201 B1* | 6/2008 | Binns | G06Q 10/04 600/300 |

(Continued)

FOREIGN PATENT DOCUMENTS

JP    2020190983 A  * 11/2020 ............. G06Q 10/10

OTHER PUBLICATIONS

Yang, Yi. Qian, Wei. Zou, Hui. Insurance Premium Prediction via Gradient Tree-Boosted Tweedie Compound Poisson Models (Aug. 2015). Accessed at https://arxiv.org/abs/1508.06378 (Year: 2015).*

(Continued)

*Primary Examiner* — Meredith A Long
*Assistant Examiner* — Melinda Gieringer

(57) ABSTRACT

A computing device for predicting an expected loss for a set of claim transactions is provided. The computing device predicts, at a first machine learning model, a claim frequency of the set of claim transactions over a given time period and trained using historical frequency data and based on a segment type defining a type of claim, each type of segment having peril types. The computing device also predicts, at a second machine learning model, claim severity of the set of claim transactions during the given time period, the second machine learning model trained using historical severity data and based on the segment type and the corresponding peril types. The computing device then determines the expected loss for the set of claim transactions over the given time period by applying a product of prediction of the first machine learning model and the second machine learning model.

20 Claims, 8 Drawing Sheets

(51) Int. Cl.
   *G06Q 30/0204*   (2023.01)
   *G06Q 40/08*    (2012.01)

(56) References Cited

U.S. PATENT DOCUMENTS

| | | | | |
|---|---|---|---|---|
| 10,832,347 | B1* | 11/2020 | Westhues | G06N 20/00 |
| 10,943,301 | B1* | 3/2021 | Wu | G06F 18/40 |
| 11,367,141 | B1* | 6/2022 | Wang | G06F 16/2456 |
| 11,710,185 | B1* | 7/2023 | Westhues | G06Q 30/0283 |
| | | | | 705/4 |
| 2006/0136273 | A1* | 6/2006 | Zizzamia | G06Q 40/08 |
| | | | | 703/2 |
| 2008/0126139 | A1* | 5/2008 | Prendergast | G06Q 40/08 |
| | | | | 705/4 |
| 2010/0063851 | A1* | 3/2010 | Andrist | G06Q 40/08 |
| | | | | 705/4 |
| 2011/0161116 | A1* | 6/2011 | Peak | G01C 21/36 |
| | | | | 345/173 |
| 2019/0005198 | A1* | 1/2019 | Richards | G06Q 10/10 |
| 2020/0294154 | A1* | 9/2020 | Zimmerman | G06Q 10/06311 |
| 2021/0027387 | A1* | 1/2021 | Westhues | G07C 5/0808 |
| 2021/0287297 | A1* | 9/2021 | Hayward | G10L 15/26 |
| 2021/0366048 | A1* | 11/2021 | Westhues | G06Q 10/20 |

OTHER PUBLICATIONS

Roel Henckaerts, Marie-Pier Côté, Katrien Antonio, Roel Verbelen. Boosting insights in insurance tariff plans with tree-based machine learning methods (Apr. 12, 2019). Accessed at https://arxiv.org/abs/1904.10890v (Year: 2019).*

Lim, Dong-Young. A Neural Frequency-Severity Model and Its Application to Insurance Claims (Jun. 20, 2021). Accessed at https://arxiv.org/abs/2106.10770 (Year: 2021).*

Jeanne M. Sears, Laura Blanar, Stephen M. Bowman. Predicting work-related disability and medical cost outcomes: A comparison of Injury severity scoring methods, accessed at: <https://pubmed.ncbi.nlm.nih.gov/23347762/> (Year: 2014).*

Himmetoglu, "Stacking Models for Improved Predictions," retrieved from accessed at: <https://web.archive.org/web/20210421173738/https://www.kdnuggets.com/2017/02/stacking-models-imropved-predictions.html (Year: 2021).*

* cited by examiner

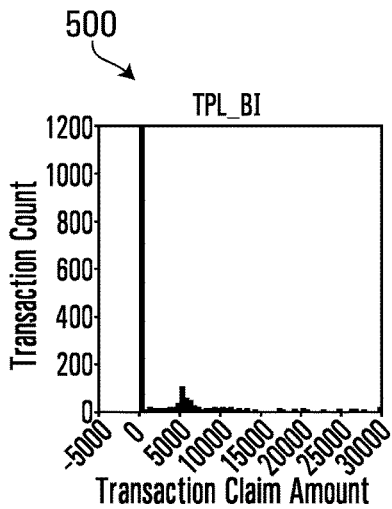
FIG. 5A
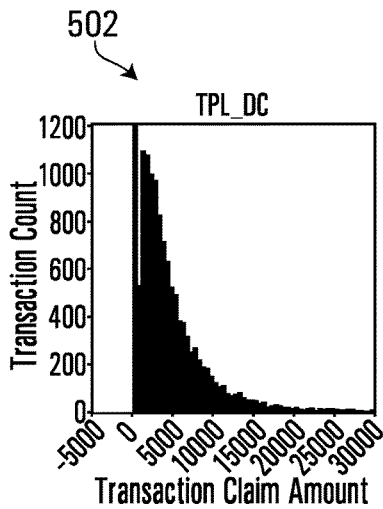
FIG. 5B
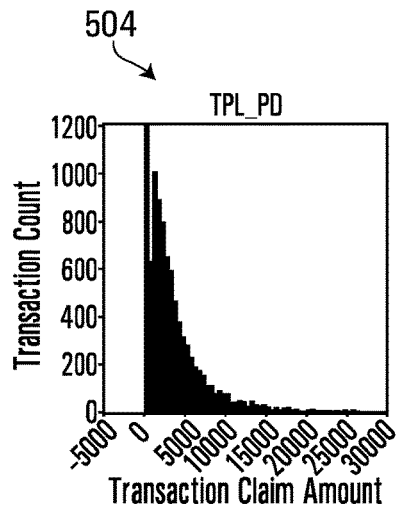
FIG. 5C
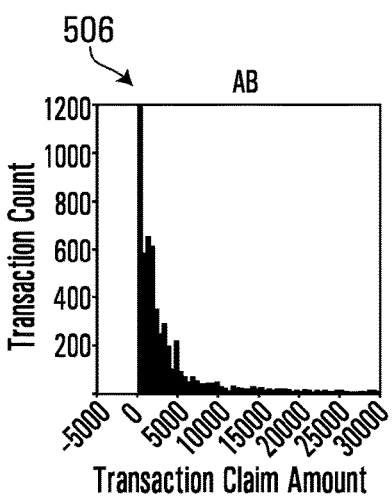
FIG. 5D
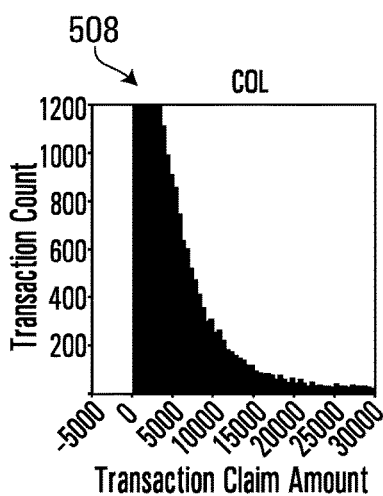
FIG. 5E
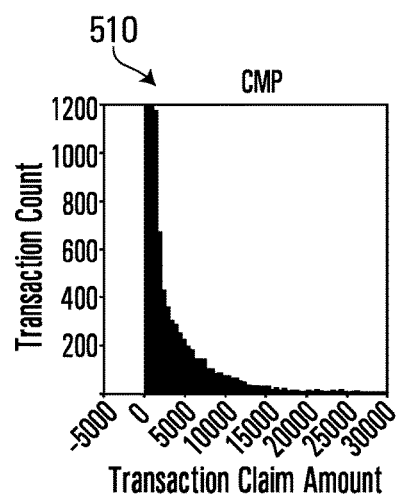
FIG. 5F
Training Data Set
|     | Total Claim Amount ($Million) | Median Severity ($1,000)* |
|-----|-------------------------------|---------------------------|
| BI  | 1091.74                       | 23.35                     |
| DC  | 691.44                        | 3.67                      |
| PD  | 394.87                        | 2.88                      |
| AB  | 966.34                        | 2.45                      |
| CMP | 450.25                        | 1.04                      |
| COL | 1401.75                       | 3.74                      |
BI=Bodily Injury
DC=Direct Compensation
PD=Property Damage
AB=Accident Benefits
CMP=Comprehensive
COL=Collision
FIG. 5G

5 Years of Data, Training Set

| | Total Claim Amount ($Million) | Median Severity ($1,000)* |
|---|---|---|
| Fire | 538.10 | 30.21 |
| Theft | 136.08 | 3.97 |
| Water | 574.20 | 8.93 |
| Other | 124.38 | 3.21 |
| Wind | 30.4 | 5.85 |
| W_Above | 36.64 | 4.74 |
| W_Below | 77.42 | 13.39 |
| Liability | 46.41 | 4.52 |

Fire=Base Coverage – Fire
Theft=Base Coverage – Theft
Water=Base Coverage – Water
Other=Base Coverage – Other
Wind=Base Coverage – Wind (Western Provinces Only)
W_Above=Water Above
W_Below=Water Below (Sewer)
Liability=Liability Coverage

SYSTEM AND METHOD FOR DETERMINING EXPECTED LOSS USING A MACHINE LEARNING FRAMEWORK

FIELD

The present disclosure relates to a system and method for determining expected loss using prediction computing models, and specifically a machine learning framework for optimizing dynamic prediction.

BACKGROUND

Predicting expected loss, or amount attributed to a portion of an insurance premium that will cover total amount a claim will cost an insurer (e.g. amount attributed to administer, investigate and process claims via one or more computing systems) is essential for insurance companies to plan and budget for the coming years. Predicting loss cost is also highly complex, with each geographical region including state/province, type of policy, and type of specific claim contributing different factors that need to be appropriately considered in the prediction. Because of this, traditional loss cost prediction methods have involved many specialized computing models tailored to each state/province, policy type, claim type, etc. With so many configured models all contributing to predictions, it becomes cumbersome and time-consuming to update and perform maintenance on all models. Additionally, this approach becomes computationally resource intensive, causes duplication and is inefficient due to the multitude of computing systems involved in performing various predictions. There is also overlapping data that is not used appropriately. Existing approaches using a multitude of prediction computing systems can also lead to inaccuracies due to the disparate sources of information which need to be manually configured for different purposes.

A need therefore exists for an improved automated method and system for optimizing determination of expected loss using a machine learning framework in a dynamic manner. Accordingly, a computer implemented system and method that addresses, at least in part, the above existing other shortcomings is desired.

SUMMARY

There is therefore a need for a computer system and method to reduce computational complexity and avoid wasting computational resources for predicting expected future losses in claim transactions.

In at least some implementations, there is provided an improved system and method for predicting annual loss cost using a machine learning framework. In at least some aspects, a reduced set of machine learning models are provided that are able to synthesize all of the different claim related data available in order to give an accurate loss cost prediction without a need for tens or hundreds of individualized machine learning models. Advantageously, in at least some aspects, this simplifies the overall computer system network by reducing the number of machine learning models utilized with reduced computational complexity in order to save on maintenance and deployment costs. In at least some aspects, the proposed systems and methods improve maintenance, monitoring and simplify deployment of machine learning computing models.

According to an aspect of the present disclosure there is provided a computer system for predicting an expected loss for a set of claim transactions received for processing at a server, the computer system comprising: a computer processor; and a non-transitory computer-readable storage medium storage having instructions that when executed by the computer processor perform actions comprising: predicting, at a first machine learning model, a claim frequency of the set of claim transactions over a given time period, the first machine learning model trained using historical frequency data for an average number of claims from a prior time period and training further performed based on a segment type defining a type of claim being submitted, each type of segment having corresponding peril types further defining the type of claim; predicting, at a second machine learning model, claim severity of the set of claim transactions during the given time period, the second machine learning model trained using historical severity data including an average loss severity value of each claim for the prior time period and based on the segment type and the corresponding peril types; determining the expected loss for the set of claim transactions over the given time period by applying a product of prediction of the first machine learning model and the second machine learning model; and, wherein the first and the second machine learning model, once trained for each of the types of segments and thereby trained for different peril types are applied for predicting a subsequent expected loss for subsequent claims associated with any one of the peril types for each segment type of claim.

In at least some implementations, the computer system further comprises training the first and the second machine learning model separately for each segment type selected from: auto insurance segment and residential insurance segment having associated data sources for each of the historical frequency data, and the historical severity data specific to a particular segment type.

In at least some implementations, the first and the second machine learning model each utilize a single gradient boosted tree model.

In at least some implementations, the first machine learning model applies Poisson regression for characterizing distribution of the historical frequency data.

In at least some implementations, the second machine learning model applies Gamma regression for characterizing distribution of the historical severity data.

In at least some implementations, the computer system further comprises collecting location and peril information relating to each of the set of claim transactions wherein the single gradient boosted tree model is configured to receive insurance claims having different types of insurance segments, associated with different locations and different perils.

In at least some implementations, the computer system further comprises, prior to predicting at the first machine learning model, aggregating claim transactions relating to each segment type for subsequent input to each machine learning model.

In at least some implementations, the first machine learning model, and the second machine learning model once trained are configured to receive a claim features dataset for each claim in the set of claim transactions, the claim features dataset comprising at least one of: client data, vehicle data, driver data, location data, claim data, claim amount, geographic statistics data per region, user experience data, types of coverage, types of endorsements, and discounts.

In at least some implementations, the computer system further comprises: aggregating sum of all claims for a particular account to generate a single claim in the set of claim transactions, the aggregating occurs between a first and a second time period when a policy change occurs relating to one or more of the claim transactions for the particular account.

According to another aspect of the present disclosure, there is provided a non-transitory computer-readable storage medium comprising instructions executable by a processor, the instructions comprising steps for the processor to: receive a set of input claims, the set of input claims having an insurance dataset defining each claim; extract a pre-defined set of claim features associated with each input claim derived from the insurance dataset; apply, for each input claim, a machine-learned model to predict a loss cost based on extracting the pre-defined set of claim features and to infer a claim type of the input claim as related to a segment type selected from different types of insurance segments, wherein applying the machine-learned model comprises: applying a first machine learned model for predicting a claim frequency for each input claim from the set of claim features; applying a second machine-learned model for predicting a claim severity for each input claim from the set of claim features; and applying a product of each predicted one of the claim frequency and the claim severity via a third loss cost model for determining the loss cost for each input claim from the set of claim features based on the segment type inferred.

According to another aspect, of the present disclosure, there is provided a computer implemented method for predicting an expected loss for a set of claim transactions received for processing at a server, the computer implemented method comprising: (a) predicting, at a first machine learning model, a claim frequency of the set of claim transactions over a given time period, the first machine learning model trained using historical frequency data for an average number of claims from a prior time period and training further performed based on a segment type defining a type of claim being submitted, each type of segment having corresponding peril types further defining the type of claim; (b) predicting, at a second machine learning model, claim severity of the set of claim transactions during the given time period, the second machine learning model trained using historical severity data including an average loss severity value of each claim for the prior time period and based on the segment type and the corresponding peril types; (c) determining the expected loss for the set of claim transactions over the given time period by applying a product of prediction of the first machine learning model and the second machine learning model; and, wherein the first and the second machine learning model, once trained for each of the types of segments and thereby trained for different peril types are applied for predicting a subsequent expected loss for subsequent claims associated with any one of the peril types for each segment type of claim.

In at least some implementations, the method further comprises: training the first and the second machine learning model separately for each segment type selected from: auto insurance segment and residential insurance segment having associated data sources for each of the historical frequency data, and the historical severity data specific to a particular segment type.

In at least some implementations, the first and the second machine learning model each utilize a single gradient boosted tree model.

In at least some implementations, the first machine learning model applies Poisson regression for characterizing distribution of the historical frequency data.

In at least some implementations, the second machine learning model applies Gamma regression for characterizing distribution of the historical severity data.

In at least some implementations, the method further comprises: collecting location and peril information relating to each of the set of claim transactions wherein the single gradient boosted tree model is configured to receive insurance claims having different types of insurance segments, associated with different locations and different perils.

In at least some implementations, the method further comprises: prior to predicting at the first machine learning model, aggregating claim transactions relating to each segment type for subsequent input to each machine learning model.

In at least some implementations, the first machine learning model, and the second machine learning model once trained are configured to receive a claim features dataset for each claim in the set of claim transactions, the claim features dataset comprising at least one of: client data, vehicle data, driver data, location data, claim data, claim amount, geographic statistics data per region, user experience data, types of coverage, types of endorsements, and discounts.

In at least some implementations, the method further comprises: aggregating sum of all claims for a particular account to generate a single claim in the set of claim transactions, the aggregating occurs between a first and a second time period when a policy change occurs relating to one or more of the claim transactions for the particular account.

According to another aspect of the present disclosure, there is provided a computer program product comprising a non-transient storage device storing instructions that when executed by at least one processor of a computing device predict an expected loss for a set of claim transactions received for processing at a server, and configure the computing device to: (a) predict, at a first machine learning model, a claim frequency of the set of claim transactions over a given time period, the first machine learning model trained using historical frequency data for an average number of claims from a prior time period and training further performed based on a segment type defining a type of claim being submitted, each type of segment having corresponding peril types further defining the type of claim; (b) predict, at a second machine learning model, claim severity of the set of claim transactions during the given time period, the second machine learning model trained using historical severity data including an average loss severity value of each claim for the prior time period and based on the segment type and the corresponding peril types; (c) determine the expected loss for the set of claim transactions over the given time period by applying a product of prediction of the first machine learning model and the second machine learning model; and, wherein the first and the second machine learning model, once trained for each of the types of segments and thereby trained for different peril types are applied to predict a subsequent expected loss for subsequent claims associated with any one of the peril types for each segment type of claim.

BRIEF DESCRIPTION OF THE DRAWINGS

These and other features of the disclosure will become more apparent from the following description in which reference is made to the appended drawings wherein:

FIGS. 5A-5F illustrate example distribution graphs of claim related data used for training and validating prediction models in the loss prediction server of FIGS. 1-3 and showing transaction claim amount versus transaction count for different peril types of claims (e.g. bodily injury, direct compensation, etc.) for claims related to auto insurance, in accordance with one or more aspects of the present disclosure.

FIG. 5G illustrates an example chart of a training data set for claims related to auto insurance and used for training the machine learning models in the loss prediction server of FIGS. 1-3, in accordance with one or more aspects of the present disclosure.

FIG. 6I illustrates an example chart of a training data set for claims related to home insurance and used for training the machine learning models in the loss prediction server of FIGS. 1-3, in accordance with one or more aspects of the present disclosure.

DETAILED DESCRIPTION

Figure 1:
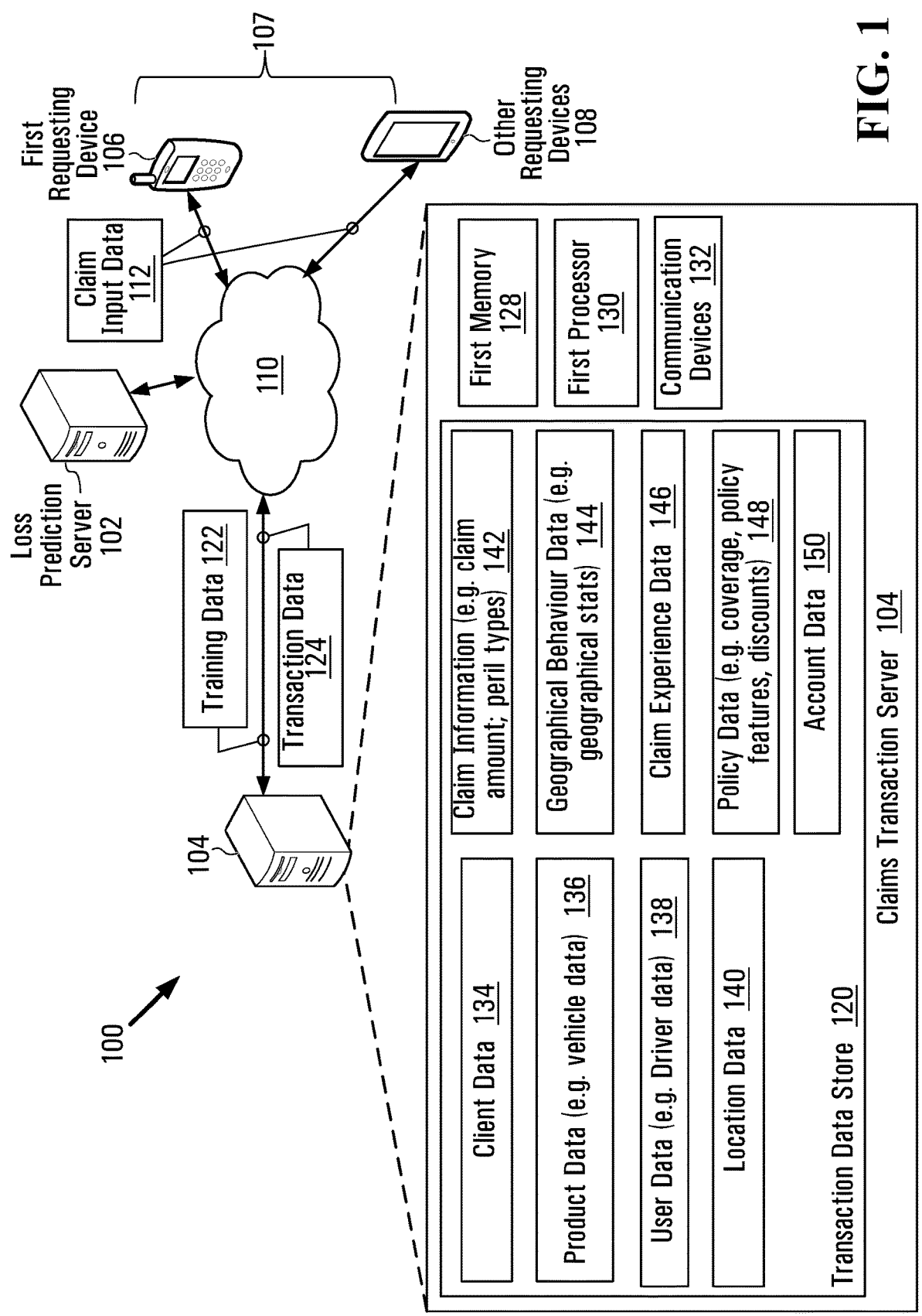
FIG. 1 is a diagram illustrating an example computing device, e.g. a loss prediction server, communicating in a communication network and configured to use a machine learning framework to predict an expected loss on a loss prediction server for one or more claim transactions communicated across the communication network in a given time period in accordance with one or more aspects of the present disclosure.

Loss cost prediction using hundreds of extremely niche models and manual configuration that focus prediction on only certain aspects of input are computationally intensive, and result in duplication of work as well as inaccurate predictions. Additionally, this cumbersome approach to prediction makes it extremely difficult to update and perform maintenance on the models, as there are many that are all tailored to only specific areas.

In at least some implementation, the present disclosure streamlines and optimizes prediction of expected loss into concise machine learning prediction models that capture loss cost predictions across all geographical locations (e.g. all provinces) and are configured to manage and interpret different input data types and formats (e.g. different types of insurance coverage including types of perils within the automobile and the home insurance segments).

In at least some aspects, the streamlined prediction machine models are configured for predicting expected loss cost based on multiplying the expected frequency of claims in a future time period with the expected severity of claims in the future time period—each of which are predicted based on respective machine learning models for predicting expected frequency and severity for all geographical locations and various peril types within different types of claim segments, e.g. automobile or home insurance segment. Advantageously, in at least some aspects, the result is a computationally efficient and manageable number of machine learning models able to process different types of information (e.g. for all geographical locations, all peril types) that can be dynamically updated and maintained. In this way, the predicted severity and frequency models may be configured for predicting loss cost regardless of location of transaction/claim or peril type (e.g. having different data formats).

In at least some aspects, the disclosed systems and methods for predicting annual loss is configured to use two machine learning prediction models: a first frequency prediction machine learning model for predicting a frequency of particular claims in a given time period based on historical claims transaction data (e.g. prior claims flagged as relevant for a training model based on expected claim inputs including insurance types and geographical locations) and a second severity prediction model for predicting a severity amount for each of the particular claims based on training the model from historical severity data relevant to the particular claims. In at least some implementations, each of the prediction models is configured and trained for one type of claim segment (e.g. home insurance) that includes a variety of insurance subtypes (e.g. peril types) and geographical locations associated with the claims. In at least some implementations, the product of their predictions is calculated by the proposed method and systems to provide an estimate of the loss cost related to each segment type (e.g. automobile insurance claims, and home insurance claims). Preferably, each of the prediction machine learning models utilized for predicting expected loss associated with a set of claim transactions, including a frequency prediction model and a severity prediction model and employs a gradient boosting algorithm and decision trees for regression.

FIG. 1 is a diagram illustrating an example computer network 100 in which a computing device shown as a loss prediction server 102 is configured to communicate with one or more other computing devices in the network, including a claims transaction server 104, requesting devices 107 having: a first requesting device 106, other requesting devices 108, using a communications network 110. Claims transaction server 104 comprises a first memory 128, a first processor 130 and one or more data stores, including a transaction data store 120 comprising storage devices coupled thereto as well as one or communication devices 132 for communicating within the claims transaction server 104 components and externally with other computing devices shown in FIG. 1. Claims transaction server 104 is configured to process claim requests (e.g. insurance claims) and related claim transactions (e.g. updating claims, or status requests relating to claims) received from one or more requesting devices 107. The requesting devices 107 include the first requesting device 106 and other requesting device 108. Such claim requests and related claims transactions may be provided as claim input data 112 and may include requests for claims to be processed (e.g. insurance claim related to auto or home associated with one or more perils and one or more geographical locations along with client account identification information).

The communications network 110 is thus coupled for communication with a plurality of computing devices. It is understood that communications network 110 is simplified for illustrative purposes. Communication network 110 may comprise additional networks coupled to the WAN such as a wireless network and/or local area network (LAN) between the WAN and the requesting devices 107, the claims transaction server 104 and the loss prediction server 102.

Figure 2:
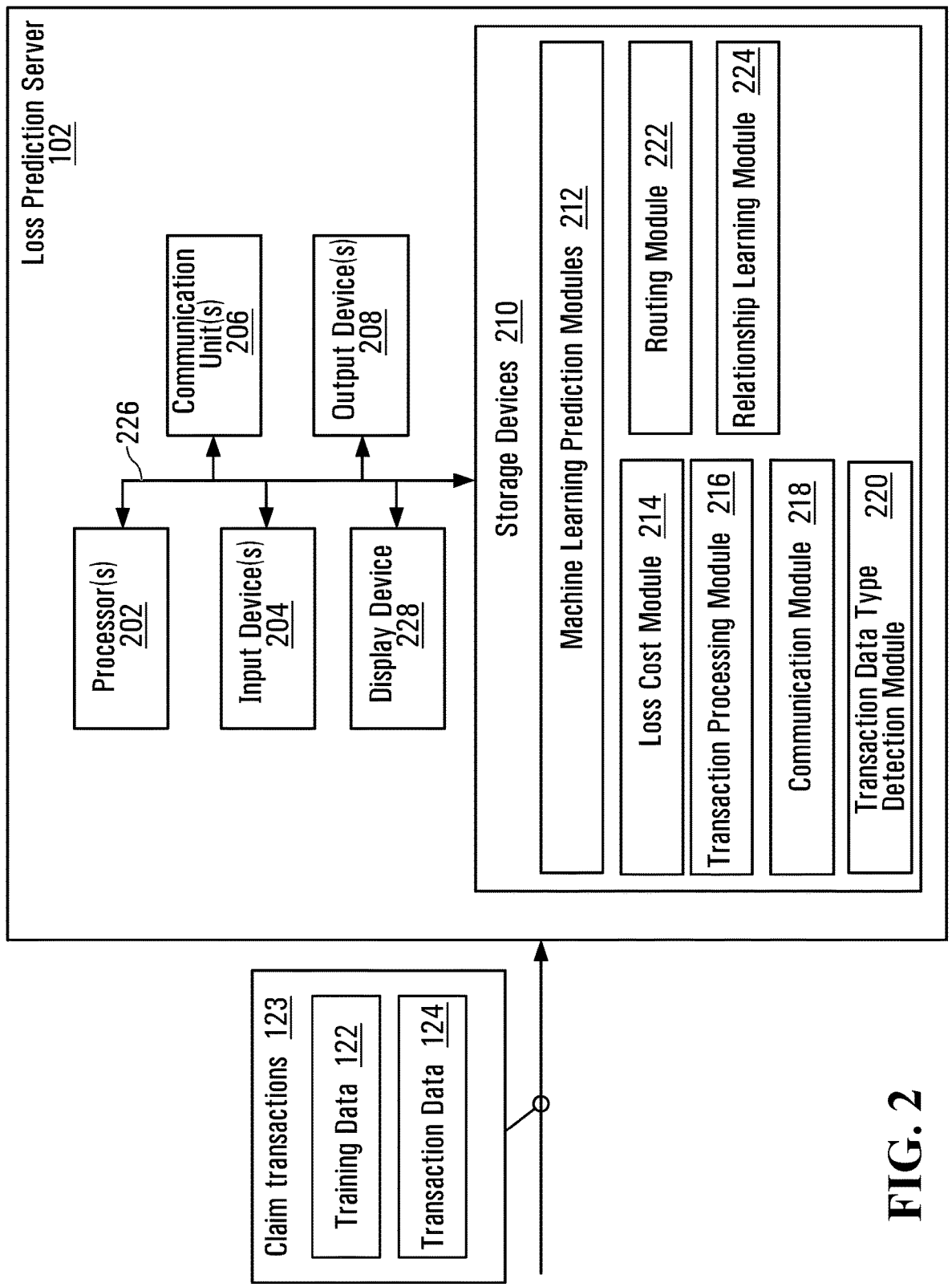
FIG. 2 is a diagram illustrating the loss prediction server of FIG. 1 in further detail for processing claims communicated across the communication network using a machine learning framework in accordance with one or more aspects of the present disclosure.
Figure 3:
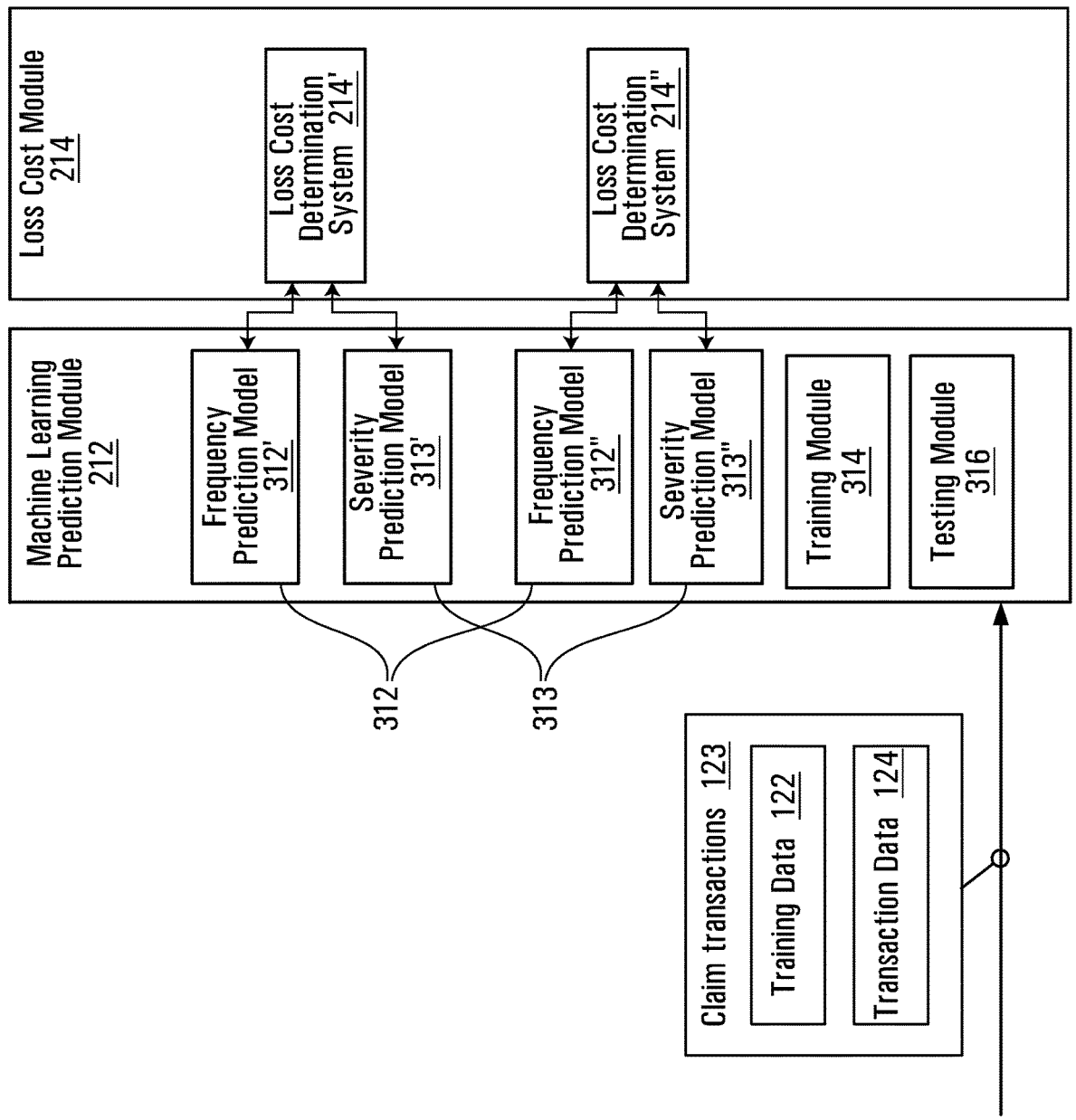
FIG. 3 is a diagram illustrating example computing components of the loss prediction server of FIG. 2 in further detail, in accordance with one or more aspects of the present disclosure.

Referring again to FIG. 1, the transaction data store 120 may further be configured to store information about current and historical claim transactions for a current user and/or other users, account information and policy data communicated through the computer network 100 (e.g. to/from requesting devices 107). The claim transactions may be related to different types of insurance segments (e.g. auto/home); different perils (e.g. subtypes defining type of insurance coverage such as bodily injury) and different geographical locations (e.g. for the claim or for the location of the account). From the claims information and related claims data stored in the transaction data store 120, the transaction data store 120 provides a set of claim features defining different aspects of each claim and associated online behaviours (e.g. client data 134, product data 136, location data 140, etc.) that may be provided as information to the loss prediction server 102. The features provide data sources used to train, validate and test each of the machine learning models (e.g. a severity prediction model to predict severity of claims and a frequency model to predict frequency of claims in order to determine an expected loss) in the loss prediction server 102. The claims data extracted from the transaction data store 120, including the claim features information may further define the transactions data 124 for processing current claim transactions (e.g. insurance claims) and predicting expected loss for same and/or training data 122 used to train one or more of the prediction machine learning models in the loss prediction server 102 (e.g. as shown in FIGS. 2 and 3) for predicting the expected loss in a future set of incoming claims.

The transaction data store 120 may contain a set of features related to one or more claim transactions including but not limited to: client data 134, product data 136, user data 138, location data 140, claim information 142, geographical behaviour data 144, claim experience data 146, policy data 148 and other account data 150.

For example, the client data 134 may contain client related data related to each of the claims including a credit score, a location of client originating the claim, and other client identification information. The product data 136 may contain data identifying one or more products within each of the claims and covered by an insurance segment type. For example, in the case of automobile insurance, the product data may include data identifying the vehicles covered including model, year, engine, rate groups, etc. The user data 138 may contain information identifying the users of the products covered by the insurance segment, such as driver variables for automobile products including age, marital status, type of driving license, years owning vehicle. The location data 140 may identify geographical location information for products covered in the insurance policy for each client (e.g. identified in account data 150). For claims related to home insurance segments, the location data 140 may include characteristics of the insured home, information about age and type of construction, property value, type of heating, etc. The claim information 142 may include claim amount information for each claim which may be aggregated via the claims transaction server 104 per each peril per transaction. The geographical behaviour data 144 may include behaviour data related to other users of the computer network 100 and/or data on populations located in geographically relevant regions to the client data 134. For example, the geographical behaviour data 144 may include median income, density of houses, and proportion of immigration and may be tagged by the locations relevant to each of the user's locations in the client data 134 and account data 150. In one example, the geographical behaviour data 144 may include geographical statistics for the population associated with each region or territory (e.g. each province) and be tagged as associated statistics data for the relevant province.

The claim experience data 146 may include information relating to experience of each of the users for the insured products in the product data 136. For example, in the case of the insurance segment being automobile insurance for a claim transaction, the claim experience data 146 may provide information relating to aggregated number of past collisions, convictions, etc. The policy data 148 may include details relating to policies associated with each claim transaction. This may include types of coverage (e.g. home/auto); aggregated policy features (e.g. renewal timeline); endorsements, discounts, etc. The account data 150 may include additional information relating to account specific information for each of the claim transactions processed.

Figure 4:
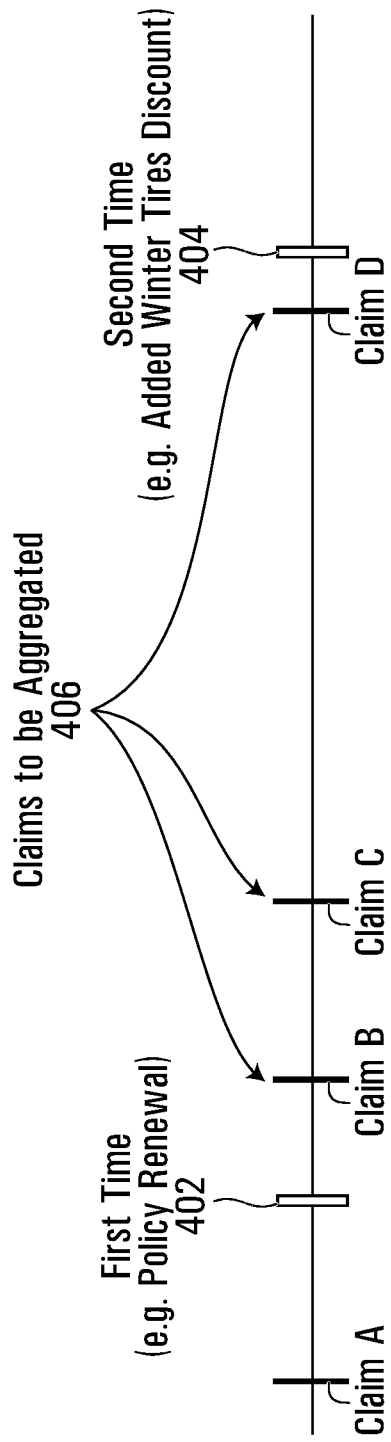
FIG. 4 is a diagram illustrating an example of aggregating claims for processing by the loss prediction server of FIG. 1, in accordance with one or more aspects of the present disclosure.

For example, each claim transaction received in the form of claim input data 112, containing current and historical claim information for each user from the requesting devices 107 may be processed and features extracted therefrom by the claims transaction server 104 to be stored as a record within the transaction data store 120 having a plurality of the set of claim features (e.g. client data 134, product data 136, user data 138, location data 140, claim information 142, geographical behaviour data 144, claim experience data 146, policy data 148, and account data 150) as illustrated in FIG. 1. Each record corresponding to a claim transaction having the set of claim features may be stored individually or aggregated as a set of records. In one aspect, as shown in FIG. 4, each set of records may be aggregated based on aggregating all claim transactions 406 related to an account or user extending between a time period when policy changes occurred on the account (e.g. policy modifications, renewals, cancellations, etc.). As shown in FIG. 4, this may include aggregating all claims occurring from a first time 402 when a policy renewal occurred and a second time 404 when another policy change occurred (e.g. added discount on policy). Conveniently, by using the claims transactions server 104 for aggregating claims for a particular product type of insurance (e.g. auto insurance) between policy changes, this allows improved training of the prediction models in the loss prediction server 102 and less data for processing within the loss prediction server 102 for determining loss. In other aspects, the aggregation of the claims to formulate a transaction as provided in the transaction data 124 may include aggregating claims related to a particular account having one or more similar features and overlapping characteristics as defined by the features in the transaction data store 120. For example, each transaction in the transaction data 124 may contain: account information; policy information; product type information (e.g. vehicle or home); user of product information (e.g. vehicle driver or home owner); peril type information; and geographical location (e.g. location of product).

Referring again to FIG. 1, the claims transaction server 104 may be configured to process and parse claim information, including claim input data 112 (e.g. claim requests, claim modifications, claim transactions) received from requesting devices 107 and store relevant components of the parsed data in the transaction data store 120 as the features shown (e.g. client data 134, product data 136, user data 138, etc.) and provide information from its storage devices including transaction data store 120 to the loss prediction server 102. As shown in FIG. 1, this information relayed may include components of the data in the transactions data store 120 used for training the prediction models in the loss prediction server 102 via the training data 122 and current transaction data 124 (which may be based on claim input data 112) from which an expected loss is to be calculated by the loss prediction server 102. In turn, the loss prediction server 102 is configured to define expected loss related to one or more claims from the requesting devices 107 (e.g. claim input data 112) using current and historical claims data including claim frequency and claim severity information to predict the expected loss and determine subsequent actions based on the expected loss for the claims transaction server 104. In some aspects, claim frequency may define claim count per exposure and claim severity may define a loss per claim count. In non-limiting examples, the computing actions of the loss prediction server 102 may include denying one or more of the claims or portion of the current or subsequent claims received via claim input data 112 from the requesting devices 107; modifying account information for the requesting devices 107 to account for an expected loss that differs from a previously calculated loss for the account such as stored in client data 134; or modifying policy information in policy data 148 to reflect an updated expected loss and issue new insurance policy to client via requesting devices 107 in response to updated expected loss predicted by the loss prediction server 102.

Claims transaction server 104 is configured to execute software instructions (e.g. via the first processor 130 and the first memory 128) to perform one or more processes consistent with the disclosed embodiments. In one embodiment, the first memory 128, the first processor 130, the communication devices 132, and the transaction data store 120 may exchange claim information and parameters (e.g. claim input data 112) that facilitate an execution and processing of one or more claim transactions by the claims transaction server 104. Referring to FIG. 2, shown is a schematic diagram of an example computing device, shown as the loss prediction server 102 of FIG. 1 in further detail, in accordance with one or more aspects of the present disclosure. Generally, in one or more aspects as described, the loss prediction server 102 as described is adapted to receive claims transaction 123. This may include historical claim related information and associated claim features as a set of training data 122. The training data 122 may relate to different geographical locations for the claims and insurance perils (e.g. claim information 142). In response to the training data 122, the loss prediction server 102 is automatically configured (via communications with the claims transaction server 104 in FIG. 1) and upon receiving the training data 122 to train each of a frequency and a severity prediction model specific to the type of claim coverage in the training data 122 (e.g. see also machine learning prediction module 212 in FIG. 3). Thus, the loss prediction server 102 automatically processes claim information received from the transaction data store 120 including the training data 122 to train prediction models such as to predict frequency and severity relating to a variety of different geographical locations and claim subtypes (e.g. insurance perils). Referring to FIGS. 2 and 3, each of the trained severity prediction model 313 and frequency prediction model 312 within the loss prediction server 102 are trained depending on claim type (e.g. auto or home) and are then automatically and dynamically utilized to predict expected loss for new claim transactions included in the transaction data 124. Preferably, and as will be described, the machine learning based training is performed using data from various geographical locations and insurance peril categories such that the loss prediction server 102 accurately predicts expected loss regardless of location or claim data type (e.g. insurance peril categories).

Referring again to FIG. 2, communication channels 226 may couple each of computing components including processors 202, input devices 204, communication units 206, output devices 208, storage devices 210, machine learning prediction module 212, a loss cost module 214, a transaction processing module 216, a communication module 218, a transaction data type detection module 220, a routing module 222, a relationship learning module 224, and a display device 228 for inter-component communications, whether communicatively, physically and/or operatively. In some examples, communication channels 226 may include a system bus, a network connection, an inter-process communication data structure, or any other method for communicating data.

One or more processors 202 may implement functionality and/or execute instructions within the loss prediction server 102. For example, processors 202 may be configured to receive instructions and/or data from storage devices 210 to execute the functionality of the modules shown in FIG. 2, among others (e.g. operating system, applications, etc.). Loss prediction server 102 may store data or information to memory including storage devices 210. Some of the functionality is described further herein below.

One or more communication units 206 may communicate with external devices shown in FIG. 1, such as the claims transaction server 104, and one or more requesting devices 107 depicted in FIG. 1, via one or more networks (e.g. the network 110) by transmitting and/or receiving network signals on one or more of the networks. The communication units 206 may include various antennae and/or network interface cards, etc. for wireless and/or wired communications.

Input devices 204 and output devices 208 may include any of one or more buttons, switches, pointing devices, cameras, a keyboard, a microphone, one or more sensors (e.g. biometric, etc.) a speaker, a bell, one or more lights, etc. One or more of same may be coupled via a universal serial bus (USB) or other communication channel, such as communication channels 226.

The one or more storage devices 210 may store instructions and/or data for processing and/or configuration of the loss prediction server 102 during operation of the loss prediction server 102. The one or more storage devices 210 may take different forms and/or configurations, for example, as short-term memory or long-term memory. Storage devices 210 may be configured for short-term storage of information as volatile memory, which does not retain stored contents when power is removed. Volatile memory examples include random access memory (RAM), dynamic random access memory (DRAM), static random access memory (SRAM), etc. Storage devices 210, in some examples, also include one or more computer-readable storage media, for example, to store larger amounts of information than volatile memory and/or to store such information for long term, retaining information when power is removed. Non-volatile memory examples include magnetic hard discs, optical discs, floppy discs, flash memories, or forms of electrically programmable memory (EPROM) or electrically erasable and programmable (EEPROM) memory.

The transaction processing module 216 may include a translational interface and be configured to obtain claim transactions 123 via transactions communicated from external computing systems, such as requesting devices 107 and claims transaction server 104 shown in FIG. 1. The transaction processing module 216 may determine from the claim transactions 123: the relevancy of the data as pertaining to training data 122; transaction data 124; or other claim related data including updates or modifications provided from other devices to update hyper parameters for the machine learning prediction module 212. The transaction processing module 216 may further be configured to consolidate the transaction data 124 from external computing sources into a normalized transaction data and aggregate claims data based on certain rules such as defined commonalities in the data, e.g. related to a particular type of claim (e.g. auto insurance or home insurance); or aggregate claims for a certain claim type or insurance perils occurring between two defined time periods such as that shown in FIG. 4 for policy changes.

The transaction processing module 216 is a real-time and continually active system that processes a spectrum of current and historical claim activity data in the claims transactions 123 including claim features provided by the claims transaction server 104 (e.g. data stored in the transaction data store) for training, testing, validating, refining and applying the machine learning prediction module 212. The transaction processing module 216 may further be configured to normalize the data received to allow more accurate analysis and application. The transaction processing module 216 may further be configured to communicate with the routing module 222, which is configured to communicate the claim transactions 123 processed, normalized and aggregated by common features via the transaction processing module 216 to the transaction data type detection module 220.

The transaction data type detection module 220 may be configured to process the claim transactions 123 (e.g. which may have been pre-processed by the transaction processing module 216) and comprising: the transaction data 124 defining current transactions; and the training data 122 defining historical transactions as well as features for training the models as received from the claims transaction server 104 and/or requesting devices 107. The transaction data type detection module 220 may be configured to parse the metadata within the claims transactions 123 received to determine which segment type or category of claims the data relates to and then communicate with a routing module 222. The routing module 222 may then be configured, based on the determined category for the transaction data, to route the claims transactions 123 (e.g. either current transaction data in the form of transaction data 124 or historical or modelling data in the form of training data 122) to each of the relevant frequency prediction model 312 (e.g. a first frequency prediction model 312' configured for auto insurance type claims) or the severity prediction model 313 (e.g. a first severity prediction model 313' configured for severity prediction for auto insurance type claims), as needed.

Referring to FIGS. 2 and 3, the machine learning prediction module 212 is configured to cooperate with the routing module 222 to route the transaction data 124 to the frequency prediction model(s) 312, and the severity prediction model(s) 313. As shown in FIG. 3, the machine learning prediction module 212 further comprises a training module 314 configured for training each of the models to generate a trained model, and a testing module 316 configured for testing each of the trained models and updating the model with additional hyper parameters and modelling data, as needed. As shown in FIG. 3, there may exist more than one of each of the frequency prediction model 312 and severity prediction model 313 to accommodate more than one claim segment type of claim (e.g. auto insurance claims; or home insurance claims). As illustrated in FIG. 3, the frequency prediction model 312 may comprise a first frequency prediction model 312' which may be trained and tested for predicting expected frequency of claims over a given future time period for a first category of claim types expected in claim data (e.g. claim input data 112) such as auto insurance. Similarly, a first severity prediction model 313' may be trained and tested for predicting an expected severity of claims over a given future time period for a second category of claim types expected in the claim input data 112 such as home insurance. Conveniently, the machine learning prediction module 212 is configured to obtain and process different data types and formats. In at least some aspects, the machine learning prediction module 212 is configured to utilize a single gradient boosted tree model for all geographical regions of the data received for each of the frequency prediction model 312 and severity prediction model 313.

Referring to FIGS. 2 and 3, the machine learning prediction module 212 may comprise an application and may be configured to obtain the training data 122 including one or more features extracted from the transaction data store 120 via the claims transaction server 104 for training each of the frequency prediction model 312 and the severity prediction model 313. The training data 122 retrieved for the frequency prediction may include a frequency of occurrence of submission of claims for a prior historical time period associated with a first and second category of claim types also having metadata to associate with specific subtypes (e.g. insurance peril types such as bodily injury, etc.). Thus, in the example illustrated in FIG. 3, each of the first and the second frequency prediction model 312' and 312" may be further configured via the training module 314 to retrieve relevant segment or category specific information from the training data 122 (e.g. auto or home insurance data) from a prior time period.

In this way, the machine learning prediction module 212 may utilize machine learning models, as shown in FIG. 3, for predicting each of the frequency of claims and severity of claims for new incoming claim transactions. This may be facilitated by training each of the models using historical data applicable for one or more particular claim categories or segment types (e.g. auto/home insurance) using machine learning modelling such as regression techniques, etc. to proactively predict: a) frequency of claims for the claim category and b) severity of claims for the claim category based on the historical frequency and severity data. In some aspects, the historical frequency and severity data used for training has been aggregated and grouped between time periods when events occurred to affect the underlying claims (e.g. a policy change as shown in FIG. 4).

Preferably, each of the frequency prediction model(s) 312 use a Poisson regression, also may be known as a log-linear model characterizing distribution of the historical frequency data defining past number of claims over a period of time. Further, each of the severity prediction models 313 use a Gamma regression for characterizing distribution of the historical severity data defining an amount of loss of a past time period. In one or more embodiments, these types of regressions have been found to provide an accurate characterization of the data.

In some aspects, the machine learning prediction module 212 cooperates with a relationship learning module 224. The relationship learning module 224 is configured to monitor each of the trained models in the machine learning prediction module 212 so that it is configured to automatically learn from each of the data segment types used to train other models and apply machine learned data from one model to another model. For example, a trained first frequency prediction model 312' which may have been trained on auto insurance claim data for user(s) may be used by the relationship learning module 224 to parse and determine additional training data for a second frequency prediction model 312" related to home insurance claim data for the same user(s) or otherwise related user(s) such as residing at the same address. Thus the relationship learning module 224 may monitor the training of the prediction modules in the machine learning prediction module 212 and configure each model to learn from training data 122 relating to other geographical regions (e.g. provinces), perils and products such as to train subsequent models based on said relationship learning.

Thus, as shown in FIG. 3, the claims transactions 123 data may be used to train and test frequency prediction model(s) 312 and severity prediction model(s) 313 via the training module 314 and the testing module 316 to generate a trained frequency prediction models 312 and severity prediction models 313. Once trained, each of the models may be applied to cover all geographical regions and different types of insurance perils. In at least some aspects, this is facilitated by obtaining training data 122 from the claim transactions 123 which covers a range of geographical regions and insurance perils for training each of the frequency prediction models 312 and the severity prediction models 313. Thus, preferably, each of the models in the machine learning module 212 is trained based on a plurality of geographical location (e.g. all provinces) and coverage types (e.g. insurance peril types) such as to optimize multiple perils and locations in a single model, thereby replacing multiple models for each different geographical locations and peril types while allowing learning between the trained models.

The loss cost module 214 is configured for communicating with the machine learning prediction module 212 for obtaining a predicted claim frequency for the claim transactions 123 over a given time period and a predicted claim severity for the claim transactions 123 and determining an expected loss for the claim transactions 123 over the given time period based on a product of the predicted claim severity and the predicted claim frequency. The loss cost module 214 may comprise a plurality of loss cost determination components 214' and 214" each corresponding to one of the types of insurance segments or categories (e.g. auto/home insurance).

Referring to FIGS. 2 and 3, the loss cost module 214 may further be configured to cooperate with a communication module 218. The communication module 218 may be configured to communicate the expected loss cost generated by the loss cost module 214 to the claims transaction server 104 and/or the requesting devices 107 for taking further dynamic action thereon. Such actions may include automatically adjusting policies to account for a modified expected loss compared to a previously expected loss as in the policy data 148 and submitting an updated policy to an application of the requesting device 107 for subsequent claim input data; or rejecting additional claims received from the requesting devices 107 in the form of claim input data 112.

It is understood that the described operations may not fall exactly within the modules (e.g. 212, 214, 216, 218, 220, 222, 224, 312, 313) of FIGS. 2 and 3 such that one module may assist with the functionality of another module.

Figure 7:
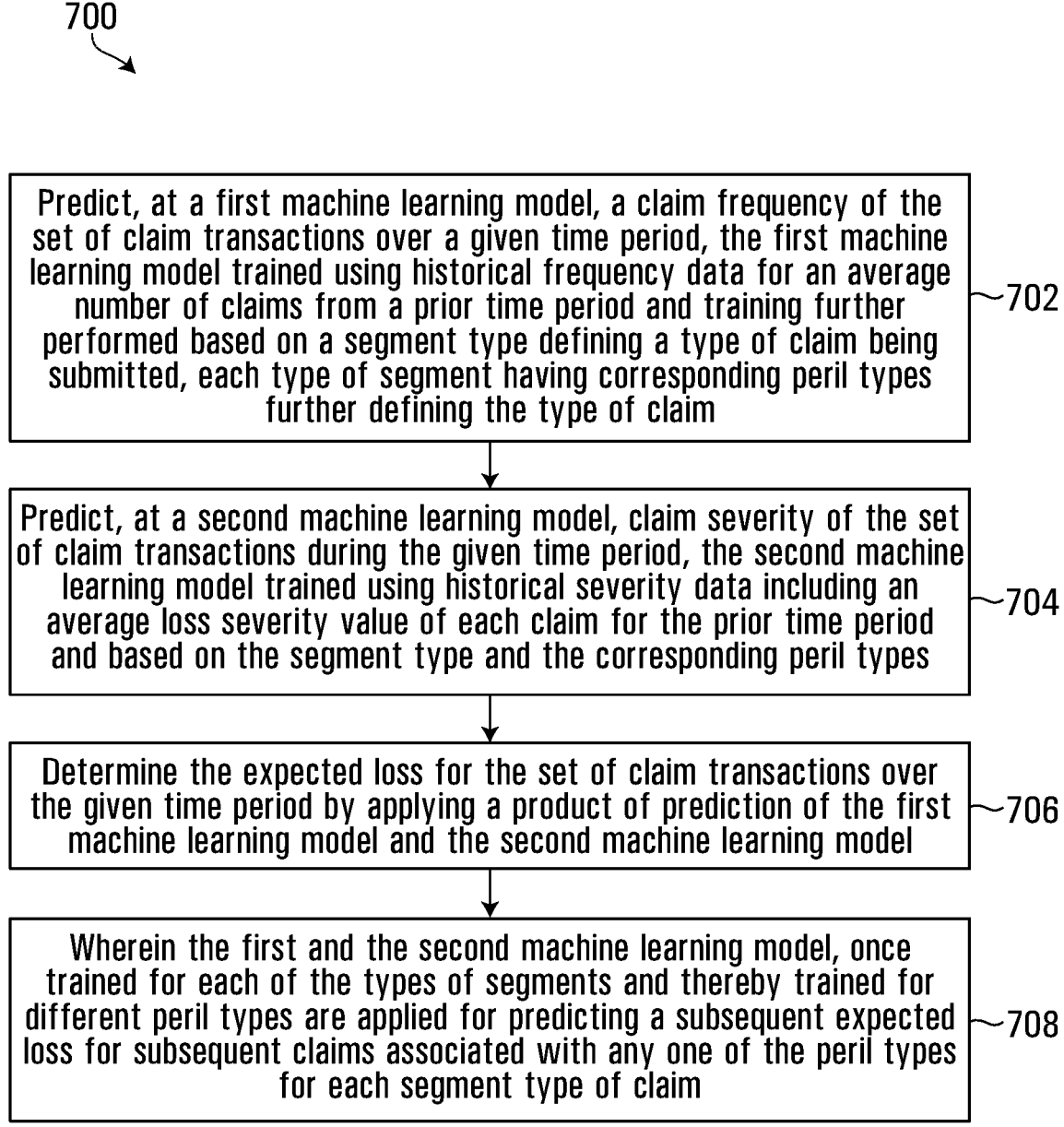
FIG. 7 is a flowchart illustrating example operations of a computing, e.g. a loss prediction server, in accordance with one or more aspects of the present disclosure.

Referring to FIG. 7, shown is a flow chart of operations 700 which are performed by a computing device such as the loss prediction server 102 shown in FIGS. 1-3. The computing device shown as the loss prediction server 102 in FIG. 1 may comprise a processor and a communications unit configured to communicate with external computing components such as requesting devices 107 and claims transaction server 104 to monitor claims and related events communicated through the computer network 100 and to determine an expected loss for subsequent claims based on historical severity and frequency data and machine learning modelling. The loss prediction server 102 is configured to utilize instructions (stored in a non-transient storage device), which when executed by the processor configured the computing device to perform operations such as operations 700.

The operations receive a set of claim transactions, which may include current and historical transactions (e.g. training data 122 providing historical claims data including claim features from transaction data store 120 and transaction data 124 providing current claim transactions and related characteristics) for processing at a claims transaction server 104, depicted in FIG. 1.

Figure 6A:
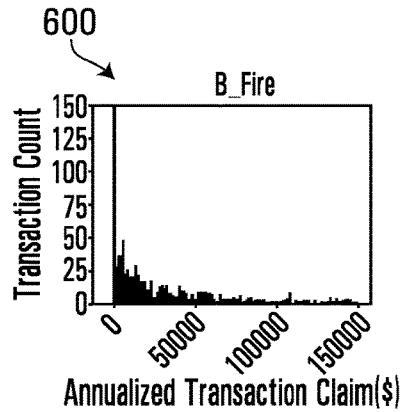
FIGS. 6A-6H illustrate example distribution graphs of claim related data used for training and validating prediction models in the loss prediction server of FIGS. 1-3 and showing transaction claim amount versus transaction count for different peril types of claims (e.g. fire, theft, water, etc.) for claims related to home insurance, in accordance with one or more aspects of the present disclosure.
Figure 6B:
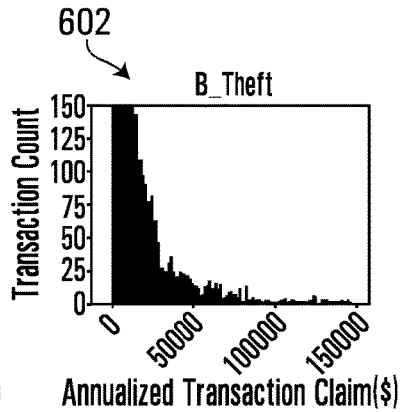
Figure 6C:
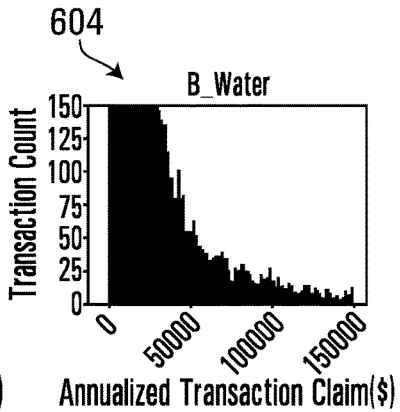
Figure 6D:
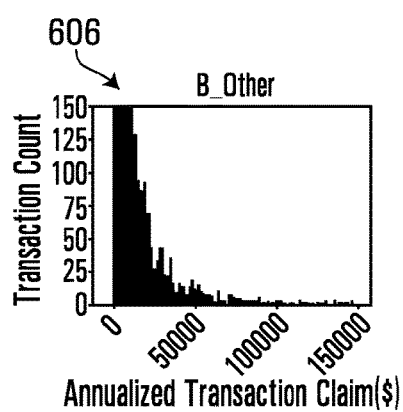
Figure 6E:
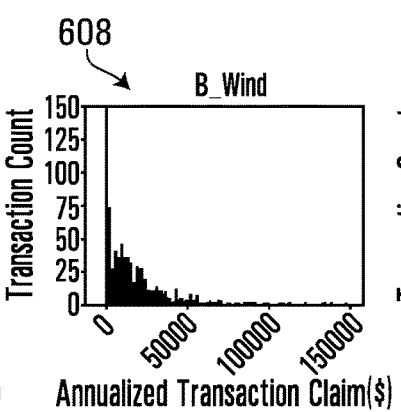
Figure 6F:
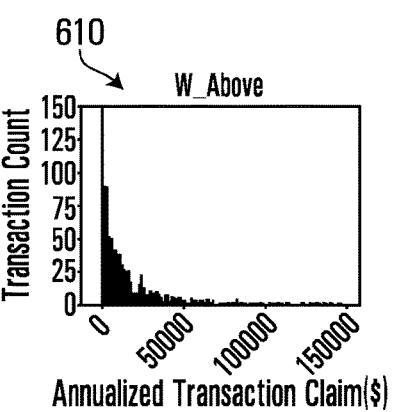
Figure 6G:
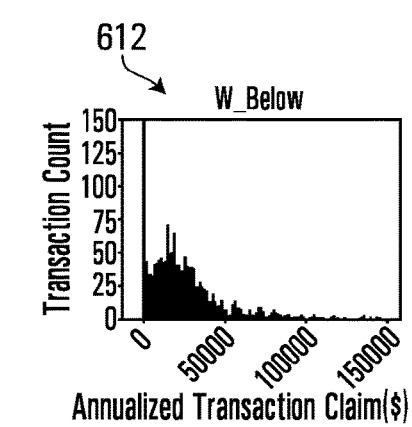
Figure 6H:
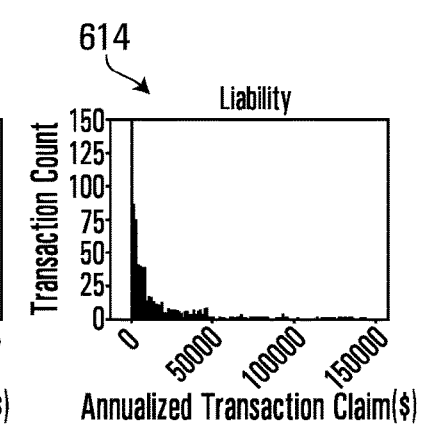

Referring to FIGS. 1-3 and 7, at step 702, operations of the computing device (e.g. the loss cost prediction server 102) predict, at a first machine learning model (e.g. a frequency prediction model 312), a claim frequency of the set of claim transactions 123 over a given time period, the first machine learning model trained using historical frequency data for an average number of claims from a prior time period such that the training is further performed based on a segment type (e.g. home insurance or auto insurance) defining a type of claim being submitted, each type of segment having corresponding peril types further defining the type of claim. Examples of peril types are shown in FIG. 5G for one segment type including at first legend 512 and in FIG. 6I at second legend 616 for another segment type.

Additionally, at step 704, operations include predicting, at a second machine learning model (e.g. a severity prediction model 313), a claim severity for the set of claim transactions 123 during the given time period, the second machine learning model trained using historical severity data including an average loss severity value of each claim for the prior time period and based on the segment type (e.g. claim transactions 123 relating to auto insurance or home insurance) and the corresponding peril types (e.g. the first legend 512 in FIG. 5G and the second legend 616).

For example, the first and the second machine learning models, once trained are configured to receive a claim features dataset (e.g. one of more of the categories of claim related data shown in the transaction data store 120) for each claim in the set of claim transactions (e.g. transaction data 124). As shown in FIG. 1, the claim features dataset may comprise one or more of: client data, vehicle data, driver data, location data, claim amount and numbers, geographic stats data per region, experience data, types of coverage, endorsements, and discounts.

Referring again to FIGS. 1-3 and 7, at step 706, operations of the loss prediction server 102 include determining the expected loss for the set of claim transactions 123 over the given time period by applying a product of prediction of an outcome of the first machine learning model and the second machine learning model.

At step 708, operations of the loss prediction server 102 are configured such that the first prediction machine learning model and the second severity prediction machine learning model, once individually trained for each of the types of segments for the claims received (e.g. claims relating to auto or home insurance) including being trained for different underlying peril types (e.g. fire, theft, water, liability, etc. for home insurance or bodily injury, direct compensation, accident benefits, comprehensive, collision associated with the types of segments) are applied for predicting a subsequent expected loss over a future time period for subsequent claims associated with any one of the peril types for each segment type of claim. Additionally, in at least some embodiments, operations of the loss prediction server 102 configured such that the first and second machine learning models are trained for historical claim data from various different geographical areas and different peril types in a single model rather than multiple disparate models and thus, the trained models may be applied to predicting an expected loss as the product from the two models. Advantageously, this allows a more efficient processing and computation speed while reducing the need for computing resources.

In at least some implementations, operations of the computing device (e.g. the loss cost prediction server 102) further include collecting geographical location and peril type information (e.g. as shown in FIGS. 5A-5G and FIGS. 6A-6I) relating to each of the input claim transactions. In this way, each of the prediction models shown in the machine learning prediction module 212 of FIG. 3 (e.g. a frequency prediction model 312 and a severity prediction model 313) which use a single gradient boosted tree model are trained using training data 122 for insurance claims having different types of insurance segments, associated with different locations and different perils and therefore able to accurately predict frequency and severity regardless of the geographical location or peril type.

Referring again now to FIGS. 1 and 3, in one example, a first set of machine learning models (e.g. a first frequency prediction model 312' and a first severity prediction model 313'), are trained via the training module 314 for claims related to a first type of insurance such as automobile insurance. Similarly, a second set of machine learning models (e.g. a second frequency prediction model 312" and a second severity prediction model 313"), are trained via the training module 314 for claims related to a second type of insurance such as home insurance models. The training may occur via the training data 122 which may include features from the transaction data store 120 related specifically to the particular type of insurance. When applied to new claims received for predicting a loss cost, e.g. via metadata contained in the transaction data, each of the first and second set of machine learning models predict loss cost based on applying the product of the predicted frequency for the new claims multiplied by the predicted severity for the new claims which provides a measure of the expected loss cost.

The determination of the loss cost for each type of claim coverage type may be provided via a respective module in the loss cost module 214, comprising one or more loss cost determination systems for each set of e.g. via a first loss cost determination system 214' and a second loss cost determination system 214". Therefore, in the current example, there are two trained machine learning models for each of the automobile and home insurance policy types, these being the frequency of claims model and the severity of claims model, for use by a loss cost determination system which provides a product of the predictions to generate the loss cost prediction. In this example, the models trained for each of the types of claims, namely the automobile and home insurance prediction utilize training data 122 from different data tables and use different feature sets, although there may be overlapping features between them. Preferably, each of the frequency prediction models 312 use a Poisson regression model for characterizing the training data 122 being processed, whereas each of the severity prediction models 313 use a Gamma regression model for processing the training data 122. In one or more embodiments, these types of regressions have been found to fit the data the best.

Referring to FIGS. 1-3, the disclosed method and system can be used for both batch and ad hoc scoring of expected loss cost as provided by the loss cost module 214. Batch scoring may be performed every day or every week, whereas ad hoc scoring may be performed when the data is slightly modified in order to see how the modification would affect the model predictions. For example, the machine learning models in the machine learning prediction module 212 can predict how aging the population in the dataset provided by the training data 122 by one year would affect the predictions overall. The current method allows for both batch and ad hoc scoring to be triggered on demand.

Referring to FIGS. 1-3, in at least some embodiments, the disclosed method and system combines a number of datasets (e.g. for different geographical regions and different sub-claim types) for training and testing into consolidated models for each of severity and frequency predictions. Thus, in at least some embodiments, a reduced set of machine learning modules are used rather than having separate frequency/severity models for each of the different insurance segments for different provinces and for different types of coverages. Preferably, each of the frequency prediction model 312 and the severity prediction model 313 is a single model with a single set of parameters that can be trained for different insurance segments.

As described herein and referring to FIG. 3, in at least some embodiments, the training data 122 which may also be used for testing includes client variables, vehicle variables, driver variables, location variables, claim amount and numbers, geographic stats data per territory, user experience variables, types of coverage, endorsements, and discounts. The training data 122 may further include aggregated policy features that include features such as how many drivers are within a single policy, the average age of drivers, etc.

In at least some aspects, the training data 122 illustrated in FIGS. 1-3, may be drawn from different datasets (e.g. as retrieved from transaction data store 120) whereby a single prediction model for each of severity and frequency prediction operates on different data sources. Data sources (e.g. as provided by transaction data store 120) may further include claim transactions, including times between consecutive policy modifications/renewals/cancellations. Transactions may also contain a number of claims that occurred within that period of time such that claim transactions may be presented as an aggregated sum (see FIG. 4) for each client rather than specific claims. For example and as illustrated in FIG. 4, a transaction may be the time between a policy renewal and adding a winter tire discount (a policy modification). Within this example transaction, three claims might take place which, in the aggregate, equal $1,000 claimed. Referring again to FIG. 4, within these claim aggregations, the claims may be separated into separate categories for both automobile and home insurance and fed into the relevant model (e.g. a first or second frequency prediction model 312' or 312"; and a first or a second severity prediction model 313' or 313") as features for training and/or testing each of the machine learning models to generate a prediction of each of frequency and severity for generating subsequently a loss cost determination via the loss cost module 214.

Advantageously, in at least some embodiments and referring to FIG. 3, a single prediction model may be used for predicting each of frequency and severity. For example, a single frequency prediction model 312 and a single severity prediction model 313 may be used for all geographical regions, products and perils of claims which allows for faster runtime. In at least some aspects, each of the machine learning prediction models may be trained with a limited number of features as extracted from the transaction data store 120 for providing improved performance. Additionally, as described herein and in reference to FIGS. 2 and 3, in at least some embodiments rather than each type of input claim associated with a different category of claim (e.g. insurance segment) having its own prediction models and the models being trained on this segment's data only, according to the present disclosure, the relationship learning module 224 allows the prediction models in the machine learning prediction module 212 to learn from one another during the training stage. In this case, a single model is trained for all segments for each of frequency and severity predictions, such that a given segment can learn from other segment's data (e.g. training data 122) as well when generating trained prediction models for the frequency and severity prediction models.

For example, as shown in FIGS. 5A-5G, transaction data for each type of claim may be categorized according to peril types for training the frequency prediction model 312 and severity prediction model 313 shown in FIGS. 1-3. For example, automobile coverage claims may be divided into different peril type categories such as: bodily injury, direct compensation, property damage, accident benefits, comprehensive, and collision. In another example, as shown in FIGS. 6A-6I, within home coverage the claims may be divided into different relevant peril types such as: fire, theft, water, other, wind, water above, water below (sewer), and liability.

Referring to FIGS. 5A-5F there are illustrated example distribution graphs of claim transactions 123 shown in FIG. 3 used for training and validating prediction models (e.g. machine learning prediction module 212) in the loss prediction server 102 of FIGS. 1-3. Each graph illustrates a transaction claim amount versus transaction count for different peril types of claims (e.g. bodily injury, direct compensation, etc.) for claims related to auto insurance, in accordance with one or more aspects of the present disclosure. Specifically, in FIG. 5A-5F, each of the views 500, 502, 504, 506, 508, and 510 illustrates transaction claim amount versus transaction count for input claims (e.g. claim transactions 123) having peril types associated with bodily injury, direct compensation, property damage, accidental benefits, collision and comprehensive. The total results are summarized in FIG. 5G.

FIG. 5G further illustrates an example chart of a training data set for claims related to auto insurance and used for training the machine learning models in the loss prediction server of FIGS. 1-3, in accordance with one or more aspects of the present disclosure.

FIGS. 6A-6H illustrate example distribution graphs of claim related data used for training and validating prediction models in the loss prediction server of FIGS. 1-3 and showing transaction claim amount versus transaction count for different category segment types of claims (e.g. fire, theft, water, etc.) for claims related to home insurance, in accordance with one or more aspects of the present disclosure.

Specifically, in FIGS. 6A-6H, each of the views 600, 602, 604, 606, 608, 610, 612, and 614 illustrates transaction claim amount vs transaction count for input claims (e.g. claim transactions 123) having peril types associated with fire, theft, water, other, wind, water above, water below (sewer), and liability coverage. The total results are summarized in FIG. 6I.

FIG. 6I illustrates an example chart of a training data set for claims related to home insurance and used for training the machine learning models in the loss prediction server of FIGS. 1-3, in accordance with one or more aspects of the present disclosure.

In at least some examples, model performance may be measured using both GINI metrics and Double Lift metrics. In at least some implementations, the proposed model shown in FIG. 3, has improved performance while replacing multiple redundant models with more multi-faceted and flexible models able to dynamically learn from other training data and accept different types of input.

Thus, in at least some aspects, each of the frequency prediction model 312 and severity prediction model 313 shown in FIGS. 1-3 may replace numerous overlapping, inaccurate, and duplicating existing models with more multi-faceted and simpler models which are computationally efficient and accurate from the training data 122 described herein.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow. Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit.

One or more currently preferred embodiments have been described by way of example. It will be apparent to persons skilled in the art that a number of variations and modifications can be made without departing from the scope of the invention as defined in the claims.

What is claimed is:

1. A computer system for predicting an expected loss for a set of claim transactions received for processing at a server, the computer system comprising:
    a computer processor; and
    a non-transitory computer-readable storage medium storage having instructions that when executed by the computer processor perform actions comprising:
    predicting, at a first machine learning model, a claim frequency of the set of claim transactions over a given time period, the first machine learning model trained using historical frequency data for an average number of claims from a prior time period and training further performed based on a segment type defining a type of claim being submitted, each type of segment having corresponding peril types further defining the type of claim;
    predicting, at a second machine learning model, claim severity of the set of claim transactions during the given time period, the second machine learning model trained using historical severity data including an average loss severity value of each claim for the prior time period and based on the segment type and the corresponding peril types;
    determining the expected loss for the set of claim transactions over the given time period by applying a product of prediction of the first machine learning model and the second machine learning model; and,
    wherein the first and the second machine learning model, once trained for each of the types of segments and thereby trained for different peril types are applied for predicting a subsequent expected loss for subsequent claims associated with any one of the peril types for each segment type of claim.

2. The computer system of claim 1, the actions further comprising: training the first and the second machine learning model separately for each segment type selected from: auto insurance segment and residential insurance segment having associated data sources for each of the historical frequency data, and the historical severity data specific to a particular segment type.

3. The computer system of claim 1, wherein the first and the second machine learning model each utilize a single gradient boosted tree model.

4. The computer system of claim 3, wherein the first machine learning model applies Poisson regression for characterizing distribution of the historical frequency data.

5. The computer system of claim 4, wherein the second machine learning model applies Gamma regression for characterizing distribution of the historical severity data.

6. The computer system of claim 3, further comprising collecting location and peril information relating to each of the set of claim transactions wherein the single gradient boosted tree model is configured to receive insurance claims having different types of insurance segments, associated with different locations and different perils.

7. The computer system of claim 6, the actions further comprising prior to predicting at the first machine learning model, aggregating claim transactions relating to each segment type for subsequent input to each machine learning model.

8. The computer system of claim 1, wherein the first machine learning model, and the second machine learning model once trained are configured to receive a claim features dataset for each claim in the set of claim transactions, the claim features dataset comprising at least one of: client data, vehicle data, driver data, location data, claim data, claim amount, geographic statistics data per region, user experience data, types of coverage, types of endorsements, and discounts.

9. The computer system of claim 1, the actions further comprising: aggregating sum of all claims for a particular account to generate a single claim in the set of claim transactions, the aggregating occurs between a first and a second time period when a policy change occurs relating to one or more of the claim transactions for the particular account.

10. A non-transitory computer-readable storage medium comprising instructions executable by a processor, the instructions comprising steps for the processor to:
    receive a set of input claims, the set of input claims having an insurance dataset defining each claim;
    extract a pre-defined set of claim features associated with each input claim derived from the insurance dataset;
    apply, for each input claim, a machine-learned model to predict a loss cost based on extracting the pre-defined set of claim features and to infer a claim type of the input claim as related to a segment type selected from different types of insurance segments, wherein applying the machine-learned model comprises:
    applying a first machine learned model for predicting a claim frequency for each input claim from the set of claim features;
    applying a second machine-learned model for predicting a claim severity for each input claim from the set of claim features; and
    applying a product of each predicted one of the claim frequency and the claim severity via a third loss cost model for determining the loss cost for each input claim from the set of claim features based on the segment type inferred.

11. A computer implemented method for predicting an expected loss for a set of claim transactions received for processing at a server, the computer implemented method comprising:
    (a) predicting, at a first machine learning model, a claim frequency of the set of claim transactions over a given time period, the first machine learning model trained using historical frequency data for an average number of claims from a prior time period and training further performed based on a segment type defining a type of claim being submitted, each type of segment having corresponding peril types further defining the type of claim;
    (b) predicting, at a second machine learning model, claim severity of the set of claim transactions during the given time period, the second machine learning model trained using historical severity data including an average loss severity value of each claim for the prior time period and based on the segment type and the corresponding peril types;
    (c) determining the expected loss for the set of claim transactions over the given time period by applying a product of prediction of the first machine learning model and the second machine learning model; and, wherein the first and the second machine learning model, once trained for each of the types of segments and thereby trained for different peril types are applied for predicting a subsequent expected loss for subsequent claims associated with any one of the peril types for each segment type of claim.

12. The computer implemented method of claim 11, further comprising: training the first and the second machine learning model separately for each segment type selected from: auto insurance segment and residential insurance segment having associated data sources for each of the historical frequency data, and the historical severity data specific to a particular segment type.

13. The computer implemented method of claim 11, wherein: the first and the second machine learning model each utilize a single gradient boosted tree model.

14. The computer implemented method of claim 13, wherein: the first machine learning model applies Poisson regression for characterizing distribution of the historical frequency data.

15. The computer implemented method of claim 14, wherein: the second machine learning model applies Gamma regression for characterizing distribution of the historical severity data.

16. The computer implemented method of claim 13, further comprising: collecting location and peril information relating to each of the set of claim transactions wherein the single gradient boosted tree model is configured to receive insurance claims having different types of insurance segments, associated with different locations and different perils.

17. The computer implemented method of claim 16, further comprising: prior to predicting at the first machine learning model, aggregating claim transactions relating to each segment type for subsequent input to each machine learning model.

18. The computer implemented method of claim 11, wherein: the first machine learning model, and the second machine learning model once trained are configured to receive a claim features dataset for each claim in the set of claim transactions, the claim features dataset comprising at least one of: client data, vehicle data, driver data, location data, claim data, claim amount, geographic statistics data per region, user experience data, types of coverage, types of endorsements, and discounts.

19. The computer implemented method of claim 11, further comprising: aggregating sum of all claims for a particular account to generate a single claim in the set of claim transactions, the aggregating occurs between a first and a second time period when a policy change occurs relating to one or more of the claim transactions for the particular account.

20. A computer program product comprising a non-transitory storage device storing instructions that when executed by at least one processor of a computing device predict an expected loss for a set of claim transactions received for processing at a server, and configure the computing device to:

(a) predict, at a first machine learning model, a claim frequency of the set of claim transactions over a given time period, the first machine learning model trained using historical frequency data for an average number of claims from a prior time period and training further performed based on a segment type defining a type of claim being submitted, each type of segment having corresponding peril types further defining the type of claim;

(b) predict, at a second machine learning model, claim severity of the set of claim transactions during the given time period, the second machine learning model trained using historical severity data including an average loss severity value of each claim for the prior time period and based on the segment type and the corresponding peril types;

(c) determine the expected loss for the set of claim transactions over the given time period by applying a product of prediction of the first machine learning model and the second machine learning model; and, wherein the first and the second machine learning model, once trained for each of the types of segments and thereby trained for different peril types are applied to predict a subsequent expected loss for subsequent claims associated with any one of the peril types for each segment type of claim.

* * * * *